US011461964B2

(12) United States Patent
Pennings et al.

(10) Patent No.: US 11,461,964 B2
(45) Date of Patent: Oct. 4, 2022

(54) SATELLITE SAR ARTIFACT SUPPRESSION FOR ENHANCED THREE-DIMENSIONAL FEATURE EXTRACTION, CHANGE DETECTION, AND VISUALIZATIONS

(71) Applicant: Ursa Space Systems Inc., Ithaca, NY (US)

(72) Inventors: Jeffrey Scott Pennings, Ann Arbor, MI (US); Justyna Weronika Kosianka, Staten Island, NY (US); Daniela Irina Moody, Los Alamos, NM (US)

(73) Assignee: Ursa Space Systems Inc., Ithaca, NY (US)

( * ) Notice: Subject to any disclaimer, the term of this patent is extended or adjusted under 35 U.S.C. 154(b) by 0 days.

(21) Appl. No.: 17/373,429

(22) Filed: Jul. 12, 2021

(65) Prior Publication Data

US 2021/0343076 A1 Nov. 4, 2021

Related U.S. Application Data

(62) Division of application No. 16/785,409, filed on Feb. 7, 2020, now Pat. No. 11,094,114.

(Continued)

(51) Int. Cl.
*G06T 17/05* (2011.01)
*G06T 17/00* (2006.01)
(Continued)

(52) U.S. Cl.
CPC .......... *G06T 17/05* (2013.01); *G01S 13/9021* (2019.05); *G06K 9/6256* (2013.01);
(Continued)

(58) Field of Classification Search
CPC .......... G06T 17/05; G06T 5/002; G06T 7/70; G06T 15/205; G06T 2207/10044;
(Continued)

(56) References Cited

U.S. PATENT DOCUMENTS 5,745,069 A     4/1998   Gail
6,388,606 B1   5/2002   Keydel et al.
(Continued)

OTHER PUBLICATIONS

Kirscht et al., "3D Reconstruction of Buildings and Vegetation from Synthetic Aperture Radar (SAR) Images", 1998 (Year: 1998).*
(Continued)

*Primary Examiner* — Phong X Nguyen
(74) *Attorney, Agent, or Firm* — Andrew J. Tibbetts; Greenberg Traurig, LLP

(57) ABSTRACT

Systems and methods for satellite Synthetic Aperture Radar (SAR) artifact suppression for enhanced three-dimensional feature extraction, change detection, and/or visualizations are described. In some aspects, the described systems and methods include a method for suppressing artifacts from complex SAR data associated with a scene. In some aspects, the described systems and methods include a method for creating a photo-realistic 3D model of a scene based on complex SAR data associated with a scene. In some aspects, the described systems and methods include a method for identifying three-dimensional (3D) features and changes in SAR imagery.

18 Claims, 15 Drawing Sheets

Related U.S. Application Data

(60) Provisional application No. 62/803,320, filed on Feb. 8, 2019.

(51) Int. Cl.
  *G06T 5/00* (2006.01)
  *G06T 15/20* (2011.01)
  *G06K 9/62* (2022.01)
  *G01S 13/90* (2006.01)
  *G06T 7/70* (2017.01)

(52) U.S. Cl.
  CPC ............... *G06T 5/002* (2013.01); *G06T 7/70* (2017.01); *G06T 15/205* (2013.01); *G06T 2207/10044* (2013.01); *G06T 2207/20081* (2013.01)

(58) Field of Classification Search
  CPC . G06T 2207/20081; G06T 15/00; G06T 5/50; G06T 17/00–30; G06T 19/00–20; G01S 13/9021; G06K 9/6256
  See application file for complete search history.

(56) References Cited

U.S. PATENT DOCUMENTS

| | | | |
|---|---|---|---|
| 10,495,750 B1 | 12/2019 | Musgrove et al. | |
| 10,705,205 B2* | 7/2020 | Wan | G01S 13/9027 |
| 10,754,028 B2 | 8/2020 | Villano et al. | |
| 11,094,114 B2 | 8/2021 | Pennings et al. | |
| 11,200,689 B1* | 12/2021 | Smith | G06N 20/10 |
| 2003/0154060 A1* | 8/2003 | Damron | G06T 17/05 703/2 |
| 2005/0052452 A1 | 3/2005 | Baumberg | |
| 2007/0002138 A1* | 1/2007 | Oldroyd | G06T 17/05 348/143 |
| 2008/0074312 A1* | 3/2008 | Cross | G06T 15/10 342/25 A |
| 2010/0020066 A1* | 1/2010 | Dammann | G09B 29/12 345/419 |
| 2013/0082870 A1 | 4/2013 | Chambers et al. | |
| 2013/0191082 A1 | 7/2013 | Barthelet et al. | |
| 2013/0243296 A1* | 9/2013 | Nandi | G06T 5/002 382/131 |
| 2013/0300740 A1* | 11/2013 | Snyder | G06T 17/05 345/419 |
| 2014/0347213 A1 | 11/2014 | Nguyen et al. | |
| 2016/0061948 A1* | 3/2016 | Ton | G01S 7/4004 342/22 |
| 2016/0103216 A1 | 4/2016 | Whelan et al. | |
| 2016/0204840 A1 | 7/2016 | Liu | |
| 2016/0259046 A1* | 9/2016 | Carlbom | G06T 17/05 |
| 2017/0010353 A1 | 1/2017 | Soofi et al. | |
| 2018/0053347 A1* | 2/2018 | Fathi | G06T 17/205 |
| 2018/0143311 A1* | 5/2018 | Melamed | G01S 13/89 |
| 2018/0158235 A1* | 6/2018 | Wu | G06T 17/05 |
| 2018/0245922 A1* | 8/2018 | Zaphir | G01C 21/005 |
| 2018/0348361 A1 | 12/2018 | Turbide | |
| 2019/0072665 A1 | 3/2019 | Wang et al. | |
| 2019/0101639 A1 | 4/2019 | Rincon et al. | |
| 2019/0346556 A1 | 11/2019 | Wang et al. | |
| 2020/0258296 A1 | 8/2020 | Pennings et al. | |
| 2021/0287037 A1* | 9/2021 | Chen | G06T 7/77 |
| 2021/0343076 A1* | 11/2021 | Pennings | G06T 5/50 |

OTHER PUBLICATIONS

Balz et al., "SAR-Based 3D-reconstruction of Complex Urban Environments", 2003 (Year: 2003).*

Villa Real et al., "A Novel Noise Removal Algorithm for Vertical Artifacts in Digital Elevation Models", 2013 (Year: 2013).*

Reid et al., "Leveraging 3D models for SAR-based navigation in GPS-denied environments", 2018 (Year: 2018).*

Kirscht et al., 3D Reconstruction of Buildings and Vegetation from Synthetic Aperture Radar (SAR) Images. InMVA Nov. 1998 (pp. 228-231).

Kusk et al., Synthetic SAR image generation using sensor, terrain and target models. InProceedings of EUSAR 2016: 11th European Conference on Synthetic Aperture Radar Jun. 6, 2016:1-5.

Remondino, Heritage recording and 3D modeling with photogrammetry and 3D scanning. Remote sensing. Jun. 2011;3(6):1104-38.

Yang et al., Improving accuracy of automated 3-D building models for smart cities. International journal of digital earth. Feb. 1, 2019;12(2):209-27.

Zheng et al., Integrated Ground-Based SAR Interferometry, Terrestrial Laser Scanner, and Corner Reflector Deformation Experiments. Sensors. Dec. 2018;18(12):4401.

U.S. Appl. No. 16/785,409, filed Feb. 7, 2020, Pennings et al.

* cited by examiner

Radar Ambiguity Illustration

Deterministic Image Ambiguity Example

Side-lobe Artifact Example

Multi-Path Artifact Example

Numbered Primary Ambiguity Zones as seen from Radar Sensor

Five focal perspectives for photo-realistic 3D model

Focal plane tie-point grid

Focal Plane to Face Model Projection

Sample set of tie-points projected onto Vendor SLC pixel grid

Vector Conversion of Face and Vertex Model

Time-variant power profile of sample vector origin

Power profile with artifact free time window identified

Complex resampling illustration for model parking structure

SATELLITE SAR ARTIFACT SUPPRESSION FOR ENHANCED THREE-DIMENSIONAL FEATURE EXTRACTION, CHANGE DETECTION, AND VISUALIZATIONS

CROSS REFERENCE TO RELATED APPLICATIONS

This application claims the benefit under 35 U.S.C. § 120 as a division of U.S. patent application Ser. No. 16/785,409, filed Feb. 7, 2020, entitled "SATELLITE SAR ARTIFACT SUPPRESSION FOR ENHANCED THREE-DIMENSIONAL FEATURE EXTRACTION, CHANGE DETECTION, AND VISUALIZATIONS," which claims priority under 35 U.S.C. § 119(e) to U.S. Provisional Patent Application Ser. No. 62/803,320, filed Feb. 8, 2019, and entitled "ENHANCING COMPLEX RADAR IMAGERY THROUGH THREE-DIMENSIONAL SCENE SIMULATION," each of which is hereby incorporated by reference in its entirety.

BACKGROUND

Synthetic Aperture Radar (SAR) has been used to generate high-resolution scans of three-dimensional (3D) objects. SAR sensors that emit the radar signal and detect reflections from the object to be scanned are often space-borne.

Prior academic and corporate research done in the space of 3D modeling of SAR data from space-borne sensors has related to prediction of two-dimensional signatures that may result from a particular object geometry.

SUMMARY

Described herein are techniques for analyzing SAR data resulting from a SAR scan of a scene, which may include one or more 3D objects, in connection with a 3D model of the scene and the 3D object(s) of the scene, to suppress SAR artifacts that may be present in the SAR data from the scan. The 3D model may be derived from electro-optical image data of the scene, a Laser Imaging, Detection, and Ranging (LIDAR) scan of the scene, architectural renderings of the scene (e.g., from Computer-Assisted Drafting (CAD) modeling software or other sources), photogrammetrically derived 3D surface models, and/or other sources. Using the 3D model of the scene at any resolution, a prediction may be generated of how the geometry of the scene may impact SAR signals directed at the scene, including how SAR signals may reflect off of the objects in the scene, such as by generating a time-variant power profile of the scene. This information on predicted reflections of SAR signals at the scene may be used to suppress (e.g., eliminate or reduce) SAR artifacts in the SAR data resulting from the SAR scan of the scene, as well as for machine learning purposes, such as providing training data for classification routines or serving as a basis for a verification step for more detailed automatic object recognition searches.

Also described herein are techniques for generating a radio frequency model of a 3D scene, using a combination of SAR data resulting from a scan of the scene and the 3D object(s) of the scene, and a 3D model of the scene and the object(s) of the scene. Such a 3D model of the scene may be derived from electro-optical image data of the scene (such as in a photogrammetric model), a LIDAR scan of the scene, architectural renderings of the scene (e.g., from CAD modeling software or other sources), and/or other sources. SAR data of the scene may be mapped to the 3D model of the scene, including to surfaces and intersections of surfaces (such as on vertex nodes and surface edges) in the 3D model. The complex SAR data (e.g., in-phase and quadrature components of the SAR signal) may then be resampled based on 3D scene mapping to generate one or more two-dimensional (2D) images of the 3D scene incorporating data from the SAR scan and from the 3D model, where each such 2D image represents a view of the 3D scene from a different angle. When multiple 2D images of the 3D scene are generated, the multiple 2D images may be used in a perspective modeling technique to generate a photo-realistic 3D model of the scene that has been derived from the SAR data and the input 3D model.

Further described herein are techniques for performing feature identification and/or extraction from SAR data of a 3D scene, including of a scene having multiple 3D objects in close proximity. Such a 3D scene may be, for example, a suburban or urban area, or other area that includes 3D objects in proximity to one another such that one object may occlude another when viewed from an angle other than a nadir. Such objects in proximity to one another may include human structures, such as commercial and/or residential buildings, roadway structures (e.g., bridges, streetlights, utility poles, etc.), and other structures. The feature extraction technique may include generating a 3D model of the scene, such as a photo-realistic 3D model of the scene, from SAR data resulting from a SAR scan of the scene and an input 3D model of the scene. The input 3D model of the scene may be derived from electro-optical image data of the scene (such as in a photogrammetric model), a LIDAR scan of the scene, architectural renderings of the scene (e.g., from CAD modeling software or other sources), and/or other sources. Once the SAR mapped 3D model of the scene is derived from the SAR data and the input 3D model, feature extraction may be performed on the output 3D model of the scene. Such feature extraction may include identifying one or more objects depicted in the output 3D model, counting one or more objects depicted in the output 3D model, identifying one or more differences over time in the output 3D model over the course of a time of a SAR scan of the scene or between different SAR scans of the scene, or other forms of feature extraction. In some cases, such features may include features related to human structures or related to an urban area, such as by deriving features indicative of economic activity in an urban area.

In some aspects, there is provided a method for suppressing artifacts from complex Synthetic Aperture Radar (SAR) data associated with a scene. The method comprises mapping the complex SAR data associated with the scene to a three-dimensional (3D) model of the scene, the 3D model of the scene comprising one or more 3D objects of the scene, predicting a location of one or more SAR artifacts associated with the one or more 3D objects in the 3D model, and suppressing the one or more SAR artifacts from the complex SAR data based on the predicted location of the one or more SAR artifacts in the 3D model.

In some embodiments, the 3D model comprises a 3D vertex and face model, and mapping the complex SAR data to the 3D model comprises mapping one or more vertices from the 3D model to one or more pixels of the complex SAR data.

In some embodiments, the 3D model of the scene extends past one or more edges of the scene in range and/or azimuth dimensions.

In some embodiments, predicting the location of the one or more SAR artifacts comprises determining one or more ambiguity zones in the range and/or azimuth dimensions.

In some embodiments, determining the one or more ambiguity zones comprises determining the one or more ambiguity zones based at least in part on sampling frequency in each dimension.

In some embodiments, suppressing the one or more SAR artifacts comprises generating a time-variant power profile for the predicted one or more SAR artifacts in the 3D model of the scene, comparing the time-variant power profile of the complex SAR data to the generated time-variant power profile based on the 3D model of the scene, based on the comparison, determining a common artifact free time window for the time-variant power profile of the complex SAR data where the predicted one or more SAR artifacts are present and for the generated time-variant power profile where the predicted one of more SAR artifacts are not present, determining, based on the common artifact free time window, a correction vector to modify the time-variant power profile for the predicted one or more SAR artifacts, and generating a modified time-variant power profile based on applying the correction vector to the time-variant power profile for the predicted one or more SAR artifacts.

In some embodiments, the one or more SAR artifacts include one or more of layover, ambiguity signatures, sidelobes, multi-path or perspective artifacts in the complex SAR data.

In some aspects, there is provided an apparatus comprising at least one processor and at least one storage medium having encoded thereon executable instructions that, when executed by the at least one processor, cause the at least one processor to carry out the method of mapping the complex SAR data associated with the scene to a three-dimensional (3D) model of the scene, the 3D model of the scene comprising one or more 3D objects of the scene, predicting a location of one or more SAR artifacts associated with the one or more 3D objects in the 3D model, and suppressing the one or more SAR artifacts from the complex SAR data based on the predicted location of the one or more SAR artifacts in the 3D model.

In some aspects, there is provided at least one computer-readable storage medium having encoded thereon executable instructions that, when executed by at least one processor, cause the at least one processor to carry out the method of mapping the complex SAR data associated with the scene to a three-dimensional (3D) model of the scene, the 3D model of the scene comprising one or more 3D objects of the scene, predicting a location of one or more SAR artifacts associated with the one or more 3D objects in the 3D model, and suppressing the one or more SAR artifacts from the complex SAR data based on the predicted location of the one or more SAR artifacts in the 3D model.

In some aspects, there is provided a method for creating a photo-realistic 3D model of a scene based on complex Synthetic Aperture Radar (SAR) data associated with a scene. The method comprises mapping the complex SAR data associated with the scene to a 3D model of the scene, suppressing one or more SAR artifacts from the complex SAR data based on the mapping to obtain cleaned complex SAR data, resampling the cleaned complex SAR data to generate one or more two-dimensional (2D) SAR images of the scene, and generating the photo-realistic 3D model of the scene based on the one or more 2D SAR images of the scene.

In some embodiments, resampling the cleaned complex SAR data comprises resampling In-phase (I) and Quadrature-phase (Q) data of the complex SAR data to generate the one or more 2D images.

In some embodiments, generating the photo-realistic 3D model of the scene comprises creating a photo-realistic 3D model of the scene at least in part by using perspective modeling with the one or more 2D SAR images to simulate the scene from one or more viewing angles.

In some embodiments, generating the photo-realistic 3D model of the scene comprises generating the photo-realistic 3D model using InSAR and/or stereo radargrammetry, In some embodiments, generating the photo-realistic 3D model of the scene comprises updating a photogrammetric 3D model of the scene.

In some embodiments, the method further comprises generating a library of training data associated with the scene. Generating the library comprises obtaining simulated SAR data labeled with objects and features within the scene, associating 2D imagery data with a high-fidelity 3D surface model of the scene and 3D objects within the scene through one or more machine learning search algorithms, and extracting 3D features and objects from the simulated SAR data based on the photo-realistic 3D model of the scene.

In some aspects, there is provided an apparatus comprising at least one processor and at least one storage medium having encoded thereon executable instructions that, when executed by the at least one processor, cause the at least one processor to carry out the method of mapping the complex SAR data associated with the scene to a 3D model of the scene, suppressing one or more SAR artifacts from the complex SAR data based on the mapping to obtain cleaned complex SAR data, resampling the cleaned complex SAR data to generate one or more two-dimensional (2D) SAR images of the scene, and generating the photo-realistic 3D model of the scene based on the one or more 2D SAR images of the scene.

In some aspects, there is provided at least one computer-readable storage medium having encoded thereon executable instructions that, when executed by at least one processor, cause the at least one processor to carry out the method of mapping the complex SAR data associated with the scene to a 3D model of the scene, suppressing one or more SAR artifacts from the complex SAR data based on the mapping to obtain cleaned complex SAR data, resampling the cleaned complex SAR data to generate one or more two-dimensional (2D) SAR images of the scene, and generating the photo-realistic 3D model of the scene based on the one or more 2D SAR images of the scene.

In some aspects, there is provided a method for identifying 3D changes in SAR imagery. The method comprises identifying one or more locations of detected change within a first set of SAR imagery of a scene having a first resolution, accessing a second set of SAR imagery of the scene having a second resolution higher than the first resolution, performing change detection within the second set of SAR imagery of the scene based on the identified one or more locations of detected change within the first SAR imagery of the scene, and mapping one or more trends within locations of detected change within the second set of SAR imagery of the scene over time based on a time history of SAR imagery of the scene.

In some embodiments, the first SAR imagery of the scene is filtered using a land-use land-cover (LULC) mask to limit the change detection within a subset of the identified one or more locations of broad area change within the scene.

In some embodiments, the LULC mask is user specified and/or determined by analyzing the first SAR imagery and/or the second SAR imagery.

In some embodiments, contents of the LULC mask are monitored to enable tracking changes within an area of interest over time.

In some embodiments, the area of interest is specified as a geospatial shape file.

In some embodiments, the method further comprises mapping the locations of detected change within the second set of SAR imagery of the scene to a 3D model of the scene.

In some embodiments, the method further comprises quantifying magnitude of volumetric change within the scene based on the 3D model of the scene, wherein quantifying the magnitude of the volumetric change in the scene comprises performing the change detection over time, and updating, based on the volumetric change, a geospatial location of one or more vertices on a second 3D model of the scene having a prior image geometry that is different from a current image geometry of the 3D model of the scene.

In some aspects, there is provided an apparatus comprising at least one processor and at least one storage medium having encoded thereon executable instructions that, when executed by the at least one processor, cause the at least one processor to carry out the method of identifying one or more locations of detected change within a first set of SAR imagery of a scene having a first resolution, accessing a second set of SAR imagery of the scene having a second resolution higher than the first resolution, performing change detection within the second set of SAR imagery of the scene based on the identified one or more locations of detected change within the first SAR imagery of the scene, and mapping one or more trends within locations of detected change within the second set of SAR imagery of the scene over time based on a time history of SAR imagery of the scene.

In some aspects, there is provided at least one computer-readable storage medium having encoded thereon executable instructions that, when executed by at least one processor, cause the at least one processor to carry out the method of identifying one or more locations of detected change within a first set of SAR imagery of a scene having a first resolution, accessing a second set of SAR imagery of the scene having a second resolution higher than the first resolution, performing change detection within the second set of SAR imagery of the scene based on the identified one or more locations of detected change within the first SAR imagery of the scene, and mapping one or more trends within locations of detected change within the second set of SAR imagery of the scene over time based on a time history of SAR imagery of the scene.

In some aspects, there is provided at least one non-transitory computer-readable storage medium having encoded thereon executable instructions that, when executed by at least one processor, cause the at least one processor to carry out one or a combination of the foregoing methods and techniques.

In some aspects, there is provided an apparatus comprising at least one processor and at least one storage medium having encoded thereon executable instructions that, when executed by the at least one processor, cause the at least one processor to carry out one or a combination of the foregoing methods and techniques.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
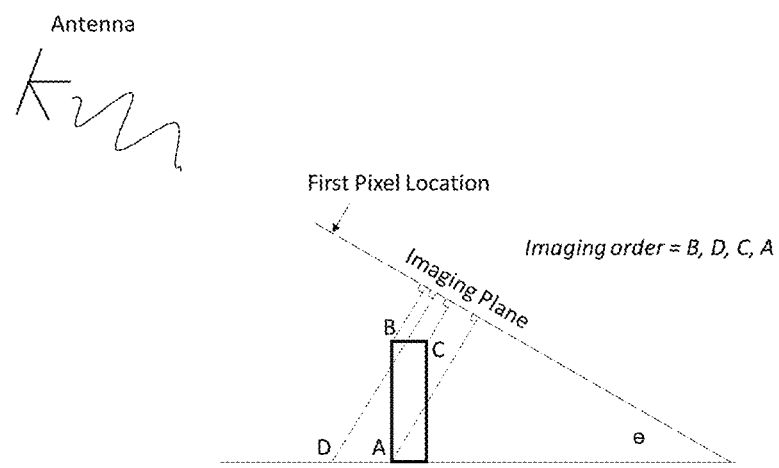
FIG. 1A shows a rectangular structure as imaged by a far-field radar antenna, according to some embodiments.

SAR data collected from SAR imaging sensors (also known as radar sensors) may be conventionally mapped to "bare-earth" elevation models. Such an elevational model may be a 2D model lacking depth information, or may be a limited 3D model that provides only topology information associated with a scene. This topology information may include only a single depth or height coordinate (or a z-axis coordinate) at each position in the scene. Such "bare-earth" elevation models can include digital elevation models (such as SRTM (Shuttle Radar Topography Mission) and World-DEM™) that are used to transform the SAR electro-magnetic data into a final product that resembles standard electro-optical imagery captured from directly overhead through a process called ortho-rectification. Ortho-rectified complex pixel products that leverage these "bare earth" elevation models are currently available from various space-borne SAR vendors.

The inventors have recognized and appreciated that such a mapping presents challenges for change detection and feature extraction for scenes that include 3D structures, including areas that include natural or human structures, such as scenes of suburban or urban areas. Such 3D structures may include, for example, vertical structures such as buildings in urban areas. While the "bare earth" elevation models can be used for modeling image-to-image changes on relatively flat surfaces with few vertical or 3D structures in close proximity, they are limited in performing change detection for vertical structures (e.g., analyzing change in and around vertical structures) that are not included in these models. Performing change detection of such vertical structures can be challenging because the same structure can create a different signature depending upon the angle at which it is imaged (e.g., due to various SAR artifacts described in detail below). When the vertical structure presents a different signature depending on angle, this can trigger a false positive for a change detection or feature classification process.

Certain change detection processes can be known for having an excess number of false positive detections, primarily due to severe differences in backscatter magnitude when viewing a scene from different look geometries. Direct pixel-to-pixel comparisons on their own are unable to distinguish between changes in the actual scene content from change due to differing geometry, resulting in significant and often overwhelming false positive detections. This difficulty extends as well to feature classification and other machine learning and computer vision algorithms. This "false change," identified from the flawed data, poses a number of constraints on SAR data collection and subsequent analytics.

For example, to avoid such changes in the SAR data. SAR data collection from a radar sensor may be performed when the SAR sensor is in the exact same location during each image collection event. In such a scenario, orbitology constraints of the spaced-based radar sensor can result in undesirably long intervals between image collection events, e.g., between 11 to 28 days.

As another example, due to the presence of such "false change" risks with vertical structures, SAR data analysis has conventionally been limited to performing change detection in areas without 3D structures, or without 3D structures that extend above ground level. Such conventional uses include performing change detection in undeveloped or rural areas or other areas without vertical structures, or performing change detection in limited scenes that do not include vertical structures, such as parking lots. To analyze a parking lot, for example, areas around a parking lot that include vertical structures, or a border area of the parking lot, may be excluded from analysis, leaving only a central part of the scene that does not include any vertical structures or occlusions or shadows from vertical structures. The inventors have recognized and appreciated that this limitation on use is disadvantageous, as much of collected SAR data may be filtered out and remain unintelligible for purposes of change detection and feature extraction.

The inventors additionally appreciated that vertical structures in a scene conventionally present other challenges to feature extraction and detection. Objects in a scene may reflect SAR signals directed to the scene in a variety of ways, including ways that create artifacts in the SAR data. Such artifacts may include ambiguity signatures, side-lobes, multi-path or layover effects (each discussed in detail below). When such artifacts are present in SAR data resulting from a SAR scan of a scene, the artifacts may appear to be structures or objects in the scene. When a scene includes many objects, such as a scene of an urban or suburban area, it may be difficult for a feature extraction process to differentiate between the artifacts and the objects, limiting the usefulness of the feature extraction process. Moreover, when there are more structures in a scene, particularly human structures, more artifacts may appear in a SAR scan of the scene. These additional artifacts can further reduce the effectiveness and usefulness of feature extraction and change detection. This had additionally led to conventional use of SAR data being limited to analysis of rural areas or other areas without vertical structures.

The inventors have appreciated that it would be advantageous to perform feature extraction and change detection of a scene including vertical, 3D structures using SAR data. The inventors additionally appreciated that a photo-realistic 3D model of a scene, derived from SAR data from a SAR scan of the scene, would be useful for multi-angle change detection for 3D structures, feature extraction for 3D structures, and intuitive scene visualization. The inventors further appreciated that it would be advantageous, in creating such a photo-realistic 3D model, to reduce, suppress, or eliminate SAR artifacts that may arise in complex SAR data (i.e., In-phase (I) and Quadrature-phase (Q) data) due to reflections of SAR signals in the scene. Such an advantageous photo-realistic 3D model may have the look and feel of imagery derived from an electro-optical sensor at nadir or as imaged from any off-nadir viewing location, with reduced SAR artifacts.

The inventors have recognized that complex SAR data can be utilized to build a 3D model of a scene and the 3D model in turn can be used to filter the complex SAR data to eliminate the SAR artifacts. The use of SAR data with digital elevation models and other topographic models described above was limited to simulating how the 3D scene would appear in a native imaging "slant" plane of a SAR instrument in an ellipsoidal or ortho-rectified raster image. In contrast to this conventional process, described below are embodiments of a method of resampling complex pixels and forming image snapshots of a scene, including embodiments for forming such image snapshots at various viewing perspectives.

In some such embodiments, a high resolution face and vertex model, which may be a photogrammetric model, may be derived from Electro-Optical Imaging sensors, a mixture of LIDAR sensors and Electro-Optical sensors, architectural renderings (e.g., created by CAD modeling software such as Trimble SketchUp, Autodesk AutoCAD, or Rhinoceros 3D), or other sources. For example, high resolution electro-optical data such as 25 cm image resolution data may be used to generate a high resolution face and vertex model associated with the scene that is to be or has been scanned with SAR to generate SAR data of the scene. Such a photogrammetric model may include 3D elements corresponding to 3D, vertical objects in the scene, such as 3D, vertical structures like buildings.

As discussed in more detail below, in some embodiments, vertices from the photogrammetric model may be mapped to sub-pixels of the SAR data. For example, the vertices may be mapped to a specific complex sub-pixel location in the native "slant" plane of a vendor-provided Single Look Complex (SLC) product incorporating SAR data, using the projection models described by vendor-specific metadata in the vendor's SLC format specification. Once the vertex transformations are computed, pixels in a perceived focal image that can be negatively affected by layover, ambiguities, or other artifacts, may be identified by analyzing the scene and subsequently predicting the locations at which artifacts would be perceived to exist. For example, locations of bright radar signatures may be predicted, and the locations of such bright signatures may be mapped to focal locations at which resulting artifacts would be perceived by a SAR sensor.

In some embodiments, artifacts in SAR data resulting from a SAR scan of the scene may be suppressed using predicted time-variant power profiles for each predicted artifact determined from the model of the scene, and based on an expected time-variant power profile of the true perceived location. Once predictable radar artifacts are eliminated or reduced in the original SAR data for a scene, In-phase (I) and Quadrature-phase (Q) SAR data may be resampled to one or more 2D images, such as a geodetic raster image or sub-scene planar image representing a particular face of the 3D model. If multiple images are generated, perspective modeling may then be used to simulate the scene from separate viewing angles to create an improved photo-realistic 3D model of the collection scene from the source radar imagery. This process may also be leveraged to generate a robust training library for use in machine learning applications. The details of the generation of the library of imagery and metadata are described below.

SAR Artifacts

In some embodiments, techniques described herein may be used to reduce, suppress, or eliminate SAR artifacts in SAR data. Such SAR artifacts may include, but are not limited to, layover, ambiguity signatures, side-lobes, multipath and perspective. Examples of each of these artifacts are described in detail below.

Figure 1B:
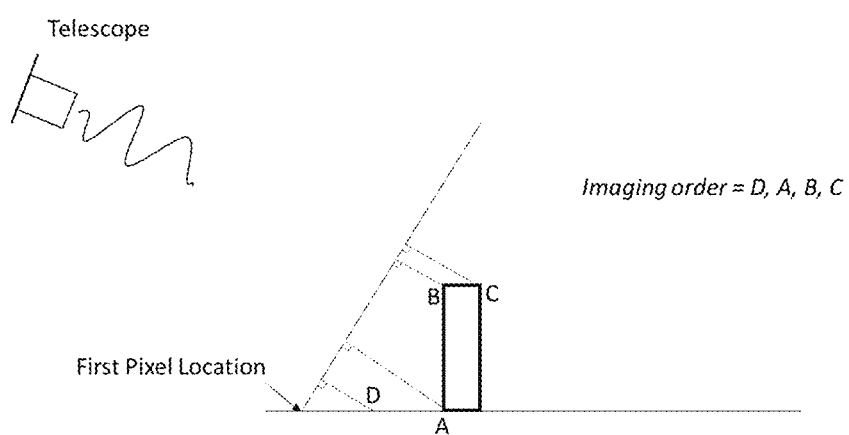
FIG. 1B illustrates imaging of the structure of FIG. 1A by a far-field electro-optical telescope, according to some embodiments.

Layover may be caused by the way in which a radar sensor records information in a non-planar 3D environment. FIG. 1A shows a rectangular structure as imaged by a far-field radar antenna, while FIG. 1B illustrates imaging of the same structure by a far-field electro-optical telescope. With an electro-optical telescope, every visible element of the rectangle is represented in a unique pixel in the resulting image. A lay person viewing the image would understand the order of points D, A, B, C, in the captured image, given the similarity between the electro-optical imaging plan and the way a lay person would perceive the structure from that perspective. In the data resulting from a radar scan, however, point D is shown in the radar image diagram co-located with image contributions that are located in between B and C, on top of the structure. Because the contents of this radar image are not arranged optically, to be understandable to a lay person (e.g., a typical image scientist or digital signal processing engineer without expertise in SAR-based systems), the contents would need to be translated.

Figure 2:
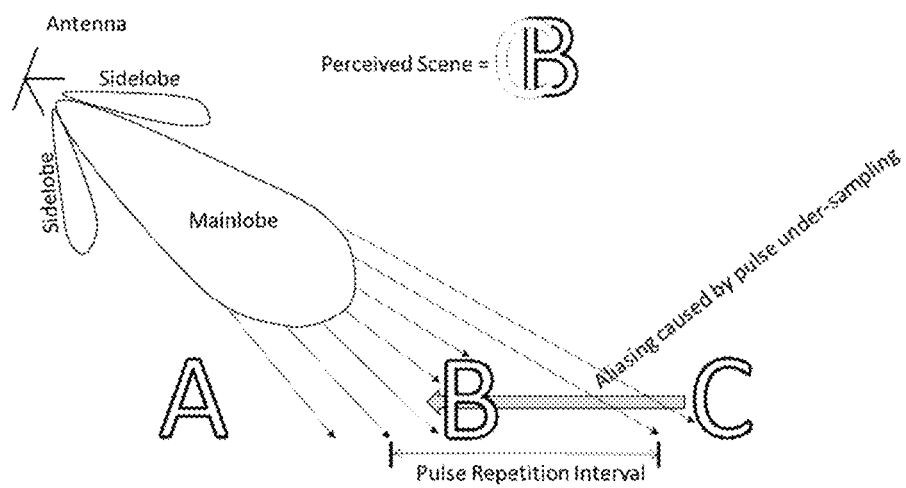
FIG. 2 shows a diagram depicting the antenna beam and bright scatterer configuration that could cause ambiguity artifacts in a SAR image, according to some embodiments.

A second artifact that may make SAR exploitation particularly difficult for a lay person is the presence of ambiguous artifacts caused by bright reflections that are recorded by non-rectangularly-shaped transmit and receive antennas. Radar collection systems are configured based on an assumption that an imaged object of interest always produces sufficiently strong returns and that the lower-power beam returns are substantially similar to ambient noise and can be filtered out (e.g., by applying a noise suppression filter). While this assumption is made, those skilled in the art understand that it is a fundamentally false assumption, as bright reflections (e.g., reflections having a higher power, such as above a filtering threshold) from an imaged object may not be filtered. Such unfiltered bright reflections may result in ambiguity artifacts. FIG. 2 shows a diagram depicting the antenna beam and bright scatterer configuration that could cause ambiguity artifacts in a SAR image. The ambiguity shown is that while C is in one particular location in the scene, the reflection from C may translate leftward in the figure (as shown by the arrow) such that the perceived scene, as shown at the top of FIG. 2, shows a lower-power, false copy of C that overlaps B. In some cases, an object in a scene may be so reflective that a SAR signal may reflect far away from the actual position of the object. The reflection may result from a SAR signal emitted in one sampling interval that, between sampling intervals, travels a far distance and is detected by the SAR sensor during a subsequent sampling interval.

Figure 3:
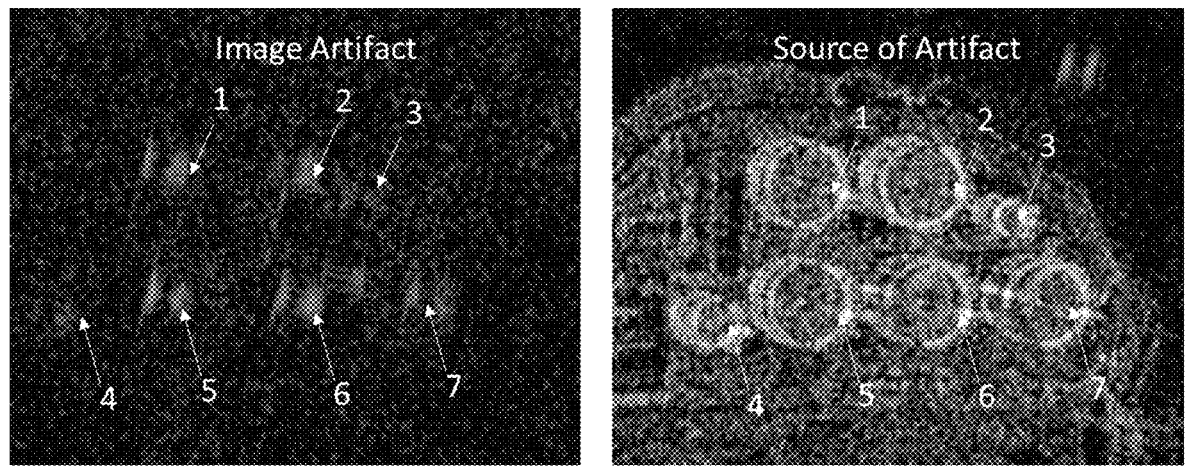
FIG. 3 shows an example of ambiguities caused by a cylindrical oil storage tank creating an artifact signature off the beam peak in one sampling interval, according to some embodiments.

Accordingly, depending on the time between sampling intervals, such artifacts may appear a certain distance (e.g., a few kilometers) away from the source, as depicted in FIG. 3, for example. The imaged scene in FIG. 3 is a piece of land in the middle of the port of Zhoushan, China, adjacent to water of the port. In the orientation of FIG. 3, the water is at the top of the image, with the land shown in much of the image. The scene also includes oil storage tanks on the land. FIG. 3 shows an example of ambiguities caused by the cylindrical oil storage tank creating a strong artifact signature off the beam peak in one sampling interval, that appears as an object in the water (see top-right of right-hand image of FIG. 3). Many radar ship detection algorithms are tuned to simply detect bright pixel responses or bright signatures in imaged areas that should correspond to regions of known bodies of water on the globe. Such a data extraction algorithm would fail due to the presence of ambiguity artifacts like that shown in FIG. 3, and subsequently would not produce quality ship detection results, because the algorithm may erroneously detect the artifact as a ship.

Figure 4:
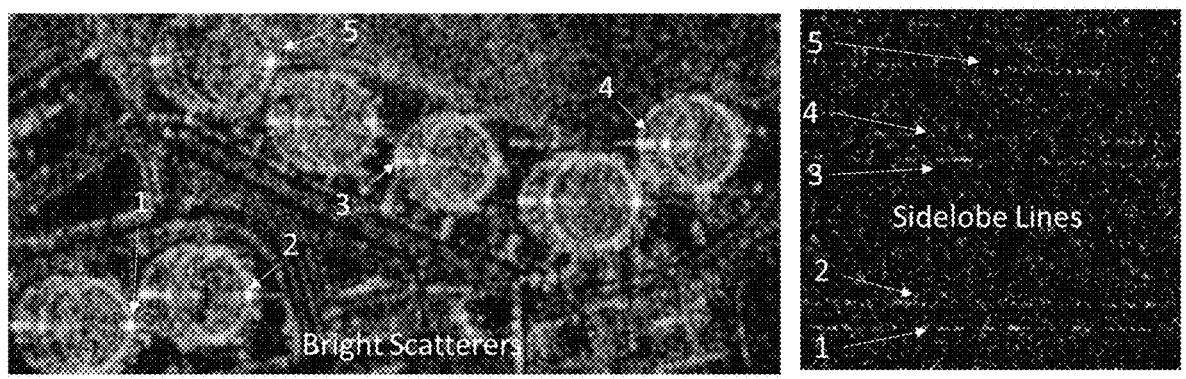
FIG. 4 shows an example of a side-lobe signature artifact in SAR imagery, according to some embodiments.

Another common artifact in SAR imagery is a side-lobe signature around bright reflectors in a range and/or cross-range (or azimuth) direction. A side-lobe can be thought of as non-zero levels in a distribution that have separated from the desired central response, as illustrated in FIG. 4. This artifact occurs because SAR point scatterers naturally exist as sync functions in the image domain, including side-lobes. In a typical radar pulse, the sync functions contain a main lobe and theoretically an infinite number of side-lobes to capture the frequency domain characteristics of the signal, but such side-lobes may not be perceptible in the image. Often, these side-lobes are weak signals and have a brightness far less than the brightness of the surrounding objects or ambient noise, and thus are often not perceptible in the SAR data. Side-lobe problems arise, however, when an extremely bright reflective object causes a reflection with a peak power greater than the surrounding pixels, meaning that side-lobes associated with the reflection may be stronger/brighter than normal and become visible in the image.

Figure 5:
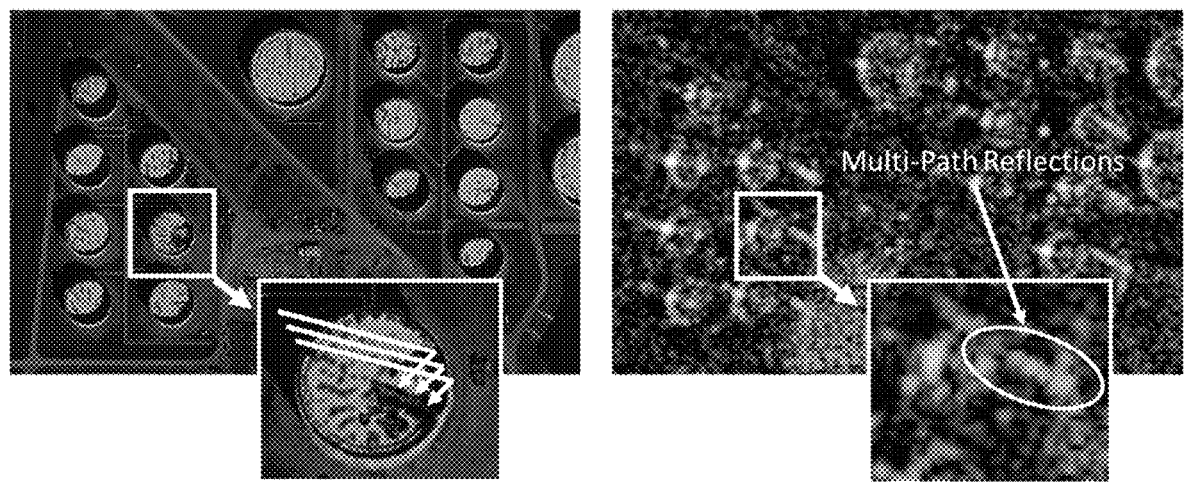
FIG. 5 shows an example of a multi-path artifact in SAR imagery, according to some embodiments.

SAR sensors measure electromagnetic propagation time to resolve the location and geometry of objects. On occasion, transmitted energy can bounce off multiple scene features to delay a return. This bouncing effect creates a trailing artifact in the SAR image known as a Multi-Path artifact, which can be contrasted to other image content obtained from Direct Path measurements. This artifact type may be difficult for a layperson to address, as it may be nearly indistinguishable from a direct path return when the imaged object type is unknown. These returns may also be highly dependent on the geometry captured in the collection, and SAR collections may not perceive the same multi-path signature on two separate collection cases. In the case of multi-path for an oil storage tank illustrated in FIG. 5, for example, the multi-path tail adversely impacts the measurement of the expected down-range shadow. In this particular example, understanding the configuration of the inlet pipe atop the floating lid is critical to identifying particular imaging geometries where a multi-path tail would need to be considered.

Another differentiating feature of radar that may lead to resulting data being non-photorealistic is perspective. Human eyes are accustomed to seeing all objects on a single plane normal to their line of sight. The most common way to create usable imagery from SAR systems that appeal to human optical sensors is to distort the image such that the human understands that the image is from above rather than from some a side angle. While this simplification is quite harmless in a rural environment with few 3D structures, it can lead to a significant loss of information in urban settings. Even if one had the ability to deconflict layover signatures in a ground projected image, there remains an inability to portray the two variants as a top-down perspective only retains the top layer.

Figure 6:
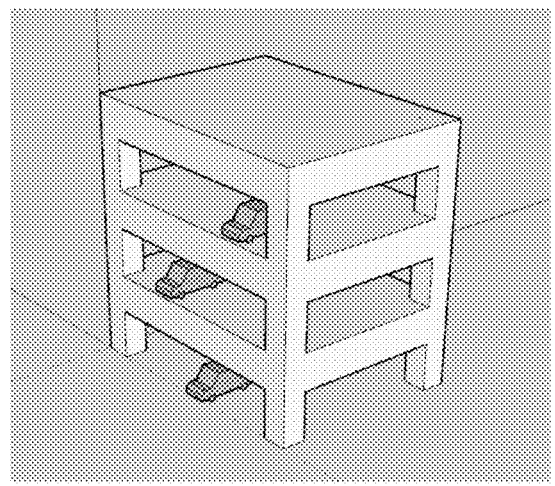
FIG. 6 shows an example of a perspective artifact in SAR imagery, according to some embodiments.

FIG. 6 depicts a parking structure model with cars parked at multiple levels. A car counting radar algorithm could be deployed to get a reasonable pulse on how busy the parking structure is using standard radar imaging geometries, so long as the images were analyzed in the native radar imaging plane. As previously mentioned, typical SAR projection techniques would confound the signal and place all cars on top of one another as layover. A more advanced algorithm that could potentially identify 3D structures and separate the layover artifacts would still struggle to render the final signal results in a single image as the traditional standard overhead image perspective would not allow it. Through 3D mapping of SAR data, perspectives outside of the traditional ground projected overhead perspective can be adopted.

Techniques for Analyzing SAR Data

To create a photo-realistic model of a collection scene, the inventors have recognized that it would be advantageous to account for, including remove or otherwise suppress, the above-mentioned SAR artifacts—in many scenarios, as many such SAR artifacts as possible. The inventors have further appreciated that feature extraction of complex pixel SAR data may be achieved in some embodiments through use of 3D scene modeling and high performance graphics rendering capabilities, including some of the techniques described below.

Figure 7:
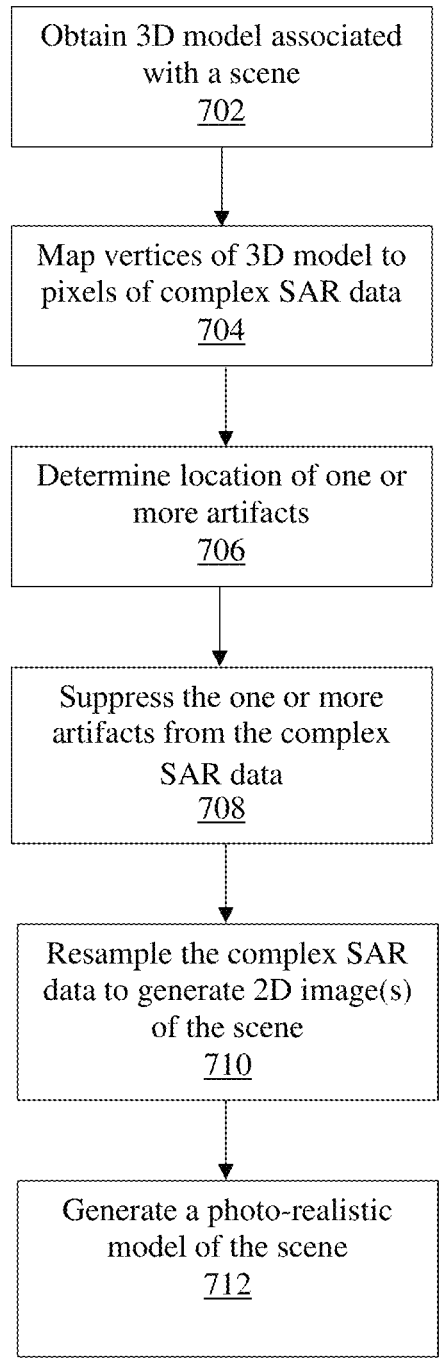
FIG. 7 illustrates a process for suppression of SAR artifacts from complex SAR data associated with a scene and generation of a photo-realistic 3D model of the scene, according to some embodiments.

FIG. 7 illustrates a process 700 that may be carried out in some embodiments for suppression of SAR artifacts from complex SAR data associated with a scene and generation of a photo-realistic 3D model of the scene. Process 700 begins in block 702, in which a 3D model (e.g., a 3D vertex and face model, a point cloud 3D model, or another suitable type of 3D model) associated with a scene is obtained. The 3D model may include data corresponding to, such as depicting, one or more objects in the scene. As discussed above, the objects in the scene may be three-dimensional and the 3D model may include data regarding the three-dimensional structure of the objects, such as including data regarding the height of the objects. The 3D model may be in various forms, examples of which are discussed above. In some embodiments, the 3D model may be generated by a SAR analysis facility that may perform subsequent analysis on the 3D model, such as by performing the analysis of blocks 704-712. For example, a SAR analysis facility may derive the 3D model by combining and analyzing a collection of 2D images. In some embodiments, such a SAR analysis facility may derive the 3D model by combining and analyzing a collection of SAR images, such as 2D SAR images.

In block 704, vertices from the 3D model may be correlated with pixels of the complex SAR data. In some embodiments, the pixels refer to the formed image resulting from the in-phase and quadrature components of the complex SAR data. Examples of this correlation are discussed in more detail below.

In block 706, a location of one or more artifacts that may be generated by the structures shown in the 3D model may be predicted. Examples of techniques for this prediction are discussed in more detail below.

In block 708, the predicted artifacts may be used to suppress actual SAR artifacts from complex SAR data. Examples of techniques for this suppression are discussed in more detail below.

In block 710, the complex SAR data (i.e., complex SAR data cleaned by suppression of the SAR artifacts) may be resampled to generate one or more 2D images of the scene.

In block 712, a photo-realistic 3D model of the scene may be generated based on the one or more 2D images of the scene. In some embodiments, the photo-realistic aspect of the 3D model may refer to lack of one or more image artifacts. While 3D mapped SAR data can still contain some imaging artifacts (e.g., perspective distortions), the photo-realistic 3D model may contain fewer imaging artifacts or no imaging artifacts at all.

The process 700 of FIG. 7 may, in some embodiments, be performed by a SAR analysis facility. Such a SAR analysis facility may be implemented as computer-executable instructions, executed by one or more processors of one or more suitable computing devices, such as a server or a desktop or laptop personal computer, a cloud computing platform or other distributed network of devices, or other suitable device(s). The SAR analysis facility may receive as input in block 702 a 3D model of a scene, and may additionally obtain SAR data of the scene, which the facility may then analyze as laid out in FIG. 7 and in accordance with techniques described herein. In some embodiments, after the photo-realistic 3D model has been generated, the facility may generate an updated model of the scene from the photo-realistic 3D model based on updated SAR data (which may lack at least some of the artifacts of the input SAR data) and output that generated model, such as by storing the generated model or outputting the model to another entity.

An example of a technique for suppression of SAR artifacts and creation of a photo-realistic model of a scene is described below. This technique may, in some embodiments, be implemented by a SAR analysis facility executing on one or more computing devices. It should be appreciated that while one specific example of a technique is described below, embodiments are not limited to operating precisely in accordance with this technique, as other techniques are possible.

A high resolution 3D vertex and face model may be obtained that corresponds to a footprint of a scene. The 3D model may be stored as computer-readable data, such as in one or more files or other suitable data structures. Additional information for the scene may be captured in an SLC product, based on SAR data from a SAR scan of the scene, provided by a satellite vendor with associated metadata to enable 3D projection. Alternatively or additionally, the additional information for the scene may be captured as a stripmap collection, which employs a linear collection geometry and a fixed antenna orientation. In some embodiments, this mode of operation may achieve fine cross-range (or azimuth) resolution while surveying the scene without gaps in coverage.

To aid in artifact suppression for the scene, in some embodiments the input 3D model of the scene may extend past the edges of the scene in both the range and cross-range (or azimuth) dimensions. The direction of the range and the azimuth dimensions may be defined relative to the orbit of the satellite. While range may be defined as the direction perpendicular to the satellite flight path, azimuth may be defined as the direction parallel to the satellite flight path.

To determine the portions that extend past the edges of the scene in both the range and cross-range (or azimuth) dimensions, or the overhang, in some embodiments vendor metadata may be used to determine the location of one or more primary ambiguity zones. In some embodiments, these zones are determined with the sampling frequency in each dimension and the Nyquist relationship in distance from a given point or origin. The zones along the range dimension may be determined by the pulse repetition frequency of the scene. Azimuth zones may be determined by the location of the object relative to the flight path of the sensor and differential doppler frequency range that it can create before wrapping around to the other side of the image.

Figure 8:
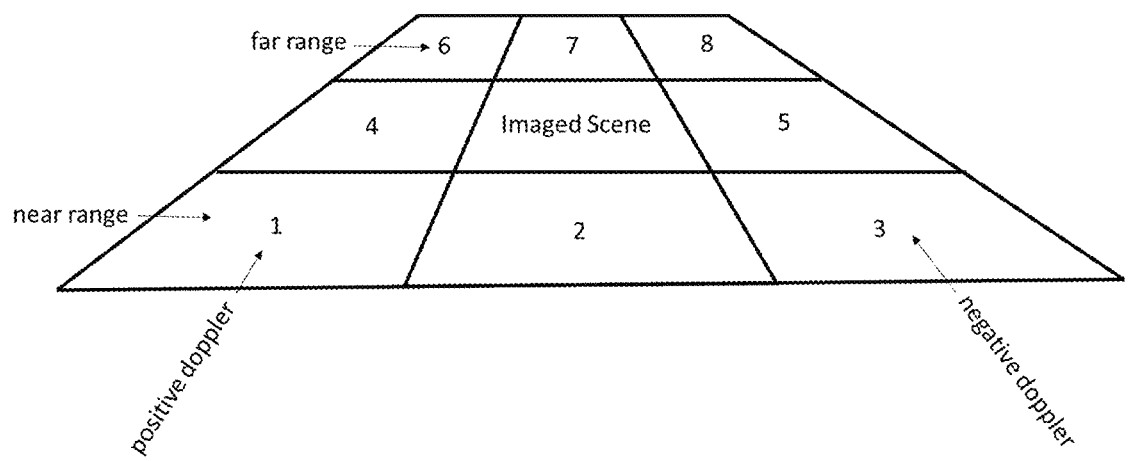
FIG. 8 shows an exemplary relationship of eight primary ambiguity zones in relation to the imaged scene, according to some embodiments.

Framing the imaged scene in the near and far range and negative and positive doppler directions, these zones contain the majority of potential ambiguity sources and are therefore useful for ambiguity modeling of the imaged scene area. FIG. 8 shows the relationship of eight primary ambiguity zones in relation to the imaged scene for a given SLC spotlight or stripmap collection. By extending the scene in the particular areas covered by the ambiguity zones, ambiguity effects can be identified (e.g., those ambiguity effects described with respect to FIGS. 2-6). In some embodiments, these ambiguity effects are conventionally difficult to identify as they arise from signal aliasing due to radar pulse under-sampling. Examining the scene in those particular zones provides the opportunity to capture the geometry of the scene and account for features that could be distorted by aliasing effects. Features within the primary imaged scene that seem ambiguous can be analyzed based on the ambiguity zones to see if a feature from within those zones is being masked, e.g., as described with respect to FIG. 2, or otherwise distorted in appearance. If distortion is apparent or likely, the distortion may be suppressed. 3D models of these areas may then be constructed without distorted features, or with features having less distortion, to be fed into a SAR signature simulator.

The input 3D model may, as discussed above, be derived from electro-optical image data of the scene (such as in a photogrammetric model), a LIDAR scan of the scene, architectural renderings of the scene (e.g., from CAD modeling software or other sources), and/or other sources. The 3D model may have information regarding a vertical geometry of an object, including storing information on a shape or dimension, or other geometry information, of multiple points along a depth or height direction at each of one or more locations, or for each location. For example, for each (x, y) coordinate in the model, the 3D model may store information for multiple z coordinates. 3D modeled scene includes high-fidelity geometric representations of the feature of interest as well as surface properties such as reflectivity factors for each object face.

Figure 9:
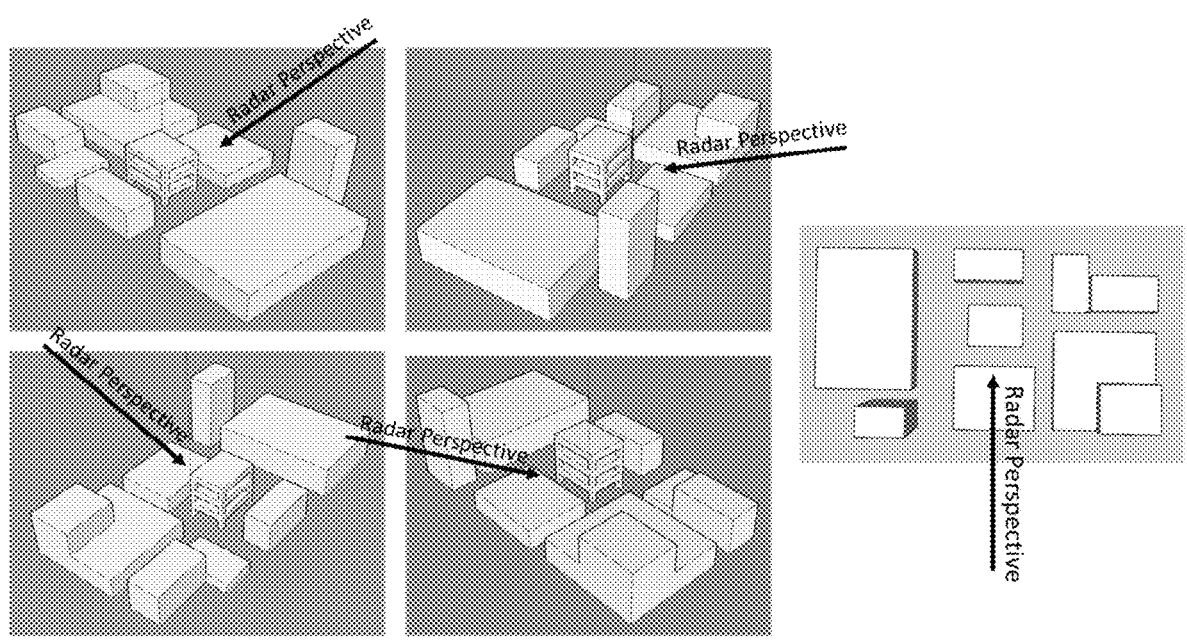
FIG. 9 shows exemplary focal planes that may be selected when generating a photo-realistic SAR model, according to some embodiments.

Once an input 3D model is acquired for the scene, one or more focal planes with defined uniform pixel spacing may be selected, as shown in FIG. 9. In one embodiment, for the purposes of creating a photo-realistic 3D model, a nadir overhead plane with four additional planes corresponding to 45 degree incidence angles off-nadir at 90 degree azimuthal offsets may be selected.

Figure 10:
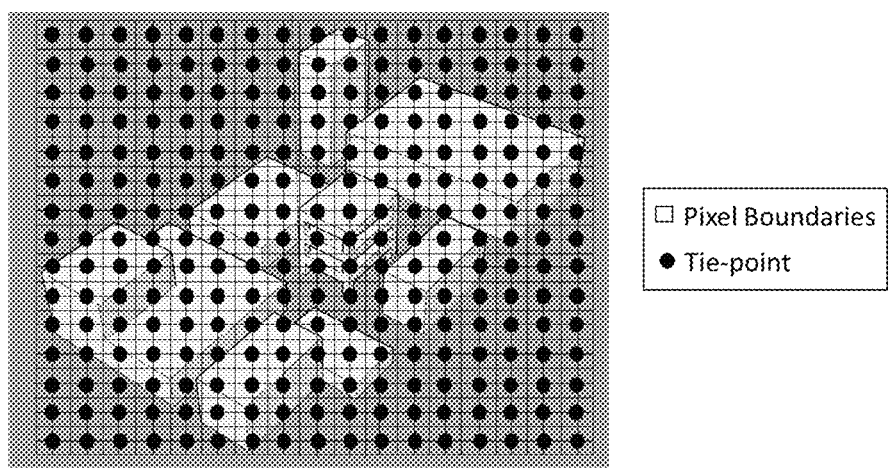
FIG. 10 shows a sample pixel grid with tie-points at a very coarse spacing so as to illustrate how the grid interacts with the 3D model of interest, according to some embodiments.

For each focal plane, a uniform pixel grid may be defined that determines the final number of complex pixels to be computed during a resampling process described in more detail below. Once the pixel grid is defined, a focal plane tie-point may be placed in between every other pixel. These tie-points represent a computational unit for later processing steps, described below. FIG. 10 shows a sample pixel grid with tie-points at a very coarse spacing so as to illustrate how the grid interacts with the 3D model of interest.

Once the focal tie-points are determined, they are projected along the focus plane normal to (i.e., perpendicular to) the focal plane defined by the SAR imagery, into the 3D model until they intersect with a face of the mesh. A perspective of this can be seen in FIG. 11, where the grid illustrated in FIG. 10 is projected toward the photo-realistic model illustrated in FIG. 9. Each tie-point is associated with a single mesh face from that focal perspective. The X- and Y-coordinates of all associated face vertices in addition to the tie-point of interest in this new vertex-centric coordinate frame are determined through an automatic extraction of model geometry.

Figure 12:
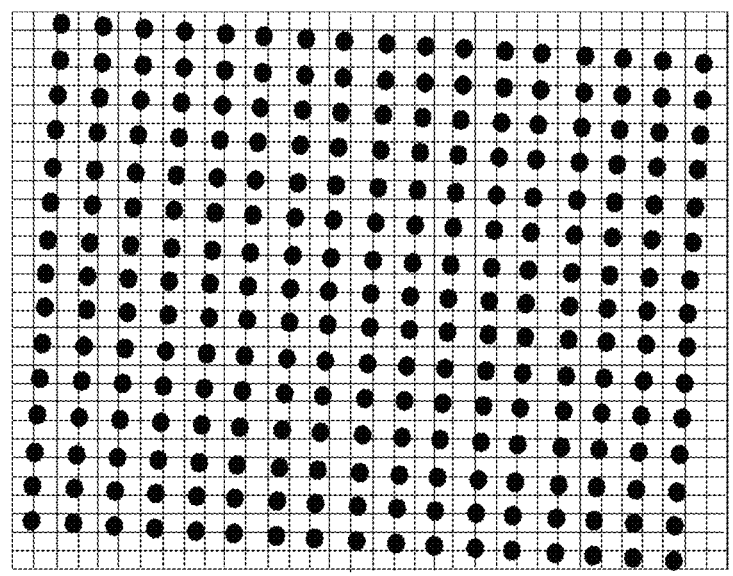
FIG. 12 illustrates mapping of a set of tie-points to a vendor provided Single Look Complex (SLC) complex pixel grid, according to some embodiments.

A bilinear mapping is created that relates the absolute X-, Y-, and Z-Earth-Centered-Earth-Fixed (ECEF) coordinates of each vertex as a function of face-centric x and y coordinates. This bilinear mapping is used to solve for the ECEF location of the intersection of the tie-point focal vector and its associated face. More conceptually, the local coordinate system defined within the 3D model is translated to a geolocated global coordinate system. These tie-point intersection points are then mapped into vendor-provided SLC product pixel grid using the vendor specific metadata provided along with the complex image. FIG. 12 illustrates how a set of tie-points can be mapped to the vendor provided SLC complex pixel grid. Having these coordinate systems correlated allows the radar imagery to be accurately represented within 3D space, which may eliminate or mitigate the need to generate a top-down, ground projected image. This is known as the 3D mapping step.

Figure 11:
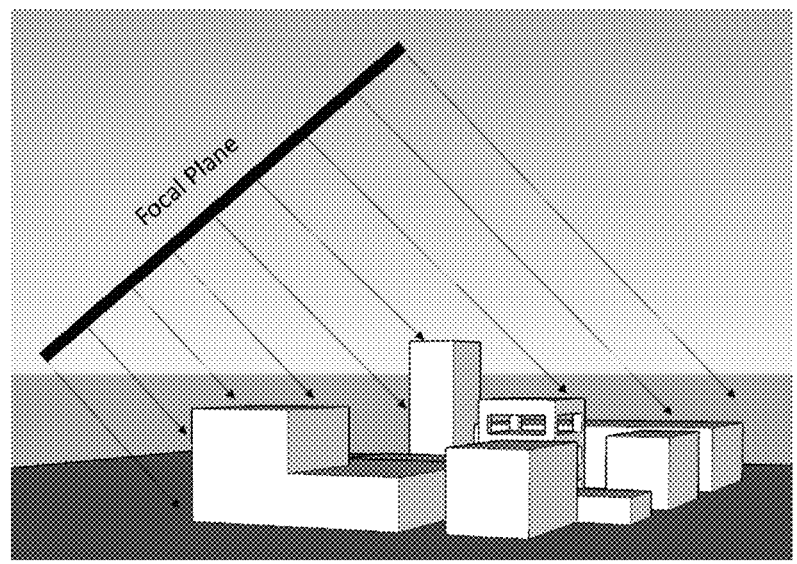
FIG. 11 shows a perspective where the grid illustrated in FIG. 10 is projected toward the photo-realistic model illustrated in FIG. 9, according to some embodiments.

One vertex from each associated face, as seen in FIG. 11, is chosen to create a face-centric coordinate scheme that maintains the X-, Y- and Z-unit vectors from the original focal plane. Once the tie-point to SLC transformation is defined, an example of which is shown in FIG. 12, the full face and vertex model is converted to a set of unit vectors with associated origin coordinates. Mesh faces are represented by a vector field where one unit vector is defined at an interval (e.g., of 9 square meter area patches) and seams, or mesh edges, are represented by multiple (e.g., as many as 60) unit vectors where one unit vector is defined at an interval (e.g., of 6 degrees). The vector field defined at the mesh edges describes the angular relationship between the faces forming the seam at intervals (e.g., of every 3 meters) along the seam.

Figure 13:
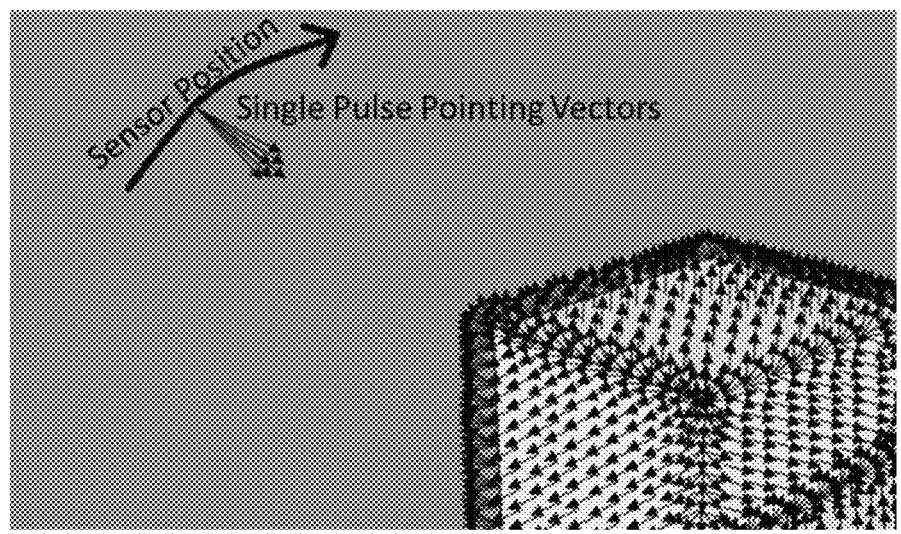
FIG. 13 illustrates conversion of the vertex and face model into an up-sampled set of vectors for radar response simulation, according to some embodiments.

FIG. 13 illustrates how the vertex and face model may be converted into an up-sampled set of vectors for radar response simulation. In addition to the 3D geometric description of the scene, radiometric properties may also be described in input. This includes look angles, resolution in range and azimuth, wavelength, etc. Converting the vertex and face defined 3D model to vector form prepares the model for interaction with a simulated radar sensor. Different radiometric models can be defined in this step. One method is to define intensity values on an object surface in terms of diffuse and specular reflection models. These models characterize the reflectivity and roughness of the surface. The small perturbation method can be introduced to adapt these models to the wavelength of the defined SAR signal.

Figure 14:
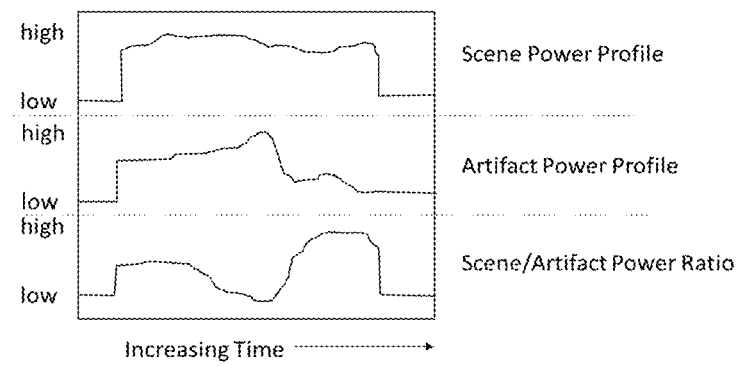
FIG. 14 shows a time-variant power profile of a sample vector origin, according to some embodiments.

A time-variant radar response curve for each vector origin is computed by summing the vendor provided antenna pattern response for each single pulse as it reflects off the 3D model, as represented in vector form, in order to bounce back at the radar. While direct path returns only return to the sensor if the origin vector is in the opposite direction as the pulse pointing vector, multi-path bounces can return to the radar sensor by reflecting off multiple origin vector surface elements. If a single vector origin (i.e., coordinate on the 3D model from where the vector emanates) has multiple vectors pointing to different positions along the recording sensor location track during the simulated collection, the time-variant power response curve would remain at a constant high power value at this vector coordinate point. This type of response would be typical of a corner point on a rectangular object and would ultimately be represented as a bright spot in the signal representation. In contrast, a vector origin located squarely in the center of a rectangular face would only exhibit a high power signature during the time window of the collection when that particular face is orthogonal to the sensor pointing vector. A time-variant power profile of a sample vector origin is depicted in FIG. 14.

Once each reflectivity vector origin is assigned a time-variant power profile, the total power integral is computed for each origin and the values are mapped to a distribution to determine the mean and standard deviation of the whole set. Vector origins that are above the mean are projected to their real location, potential ambiguous locations, range and cross-range (or azimuth) sidelobe locations, and multi-path perceived location in the SLC pixel grid corresponding to the vendor product. This process generates a more true-to-life representation of the simulated signal, which is beneficial for comparison to signals collected in the field. Radiometric output is compiled on a regular grid to form the final SAR simulated image. Imposing a regular grid on an irregular set of point clouds can introduce aliasing error. It may therefore be advantageous in some embodiments to perform a smoothing process prior to final image formation.

Artifacts from the imaged scene can be determined through analyst tagging or through automatic feature extraction through machine learning. Different artifacts may require different algorithms for successful detection. Feature detection algorithms can take advantage of the optical characteristics of the formed image of the scene (e.g., using matched filters or Generative Adversarial Networks to locate ambiguity artifacts as seen in FIG. 3) or can take advantage of energy properties of the SAR collection (e.g., using wavelet denoising and compressive sensing techniques to locate and suppress sidelobe lines associated with bright scatterers as seen in FIG. 4). In some embodiments, artifacts can be determined through a pattern recognition-based feature extraction algorithm with analyst tagging as a quality assurance step.

Once the artifact list is compiled for the SLC image, the vector origins within a small area around each tie-point face intersection point are analyzed to create an expected time-variant power profile of the scene. This reference time-variant power profile is compared to the average time-variant power profile for a small set of pixels around the tie-point face intersection SLC projection point computed at an earlier step. Prior to resampling the complex image data into the original focal plane, the slant pixels surrounding the projected SLC tie-point are extracted from the image and undergo a Fast Fourier Transform (FFT) in the cross-range (or azimuth) dimension. Each cross-range column is mapped back to a specific collection time through the vendor metadata, allowing the reference and artifact power profile values to be directly mapped to each column.

Figure 15:
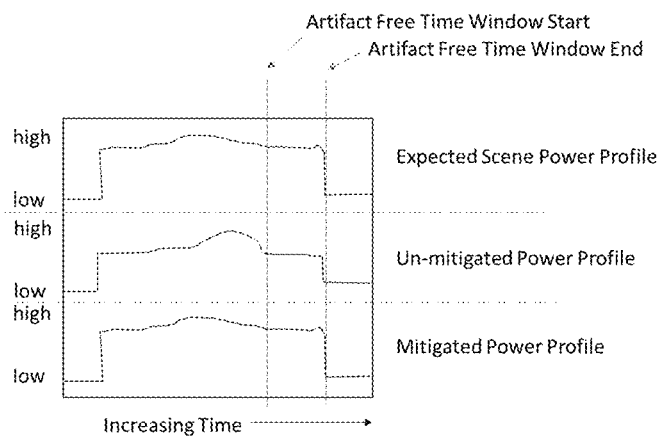
FIG. 15 shows a sample power profile with artifact free time window identified, according to some embodiments.
Figure 16:
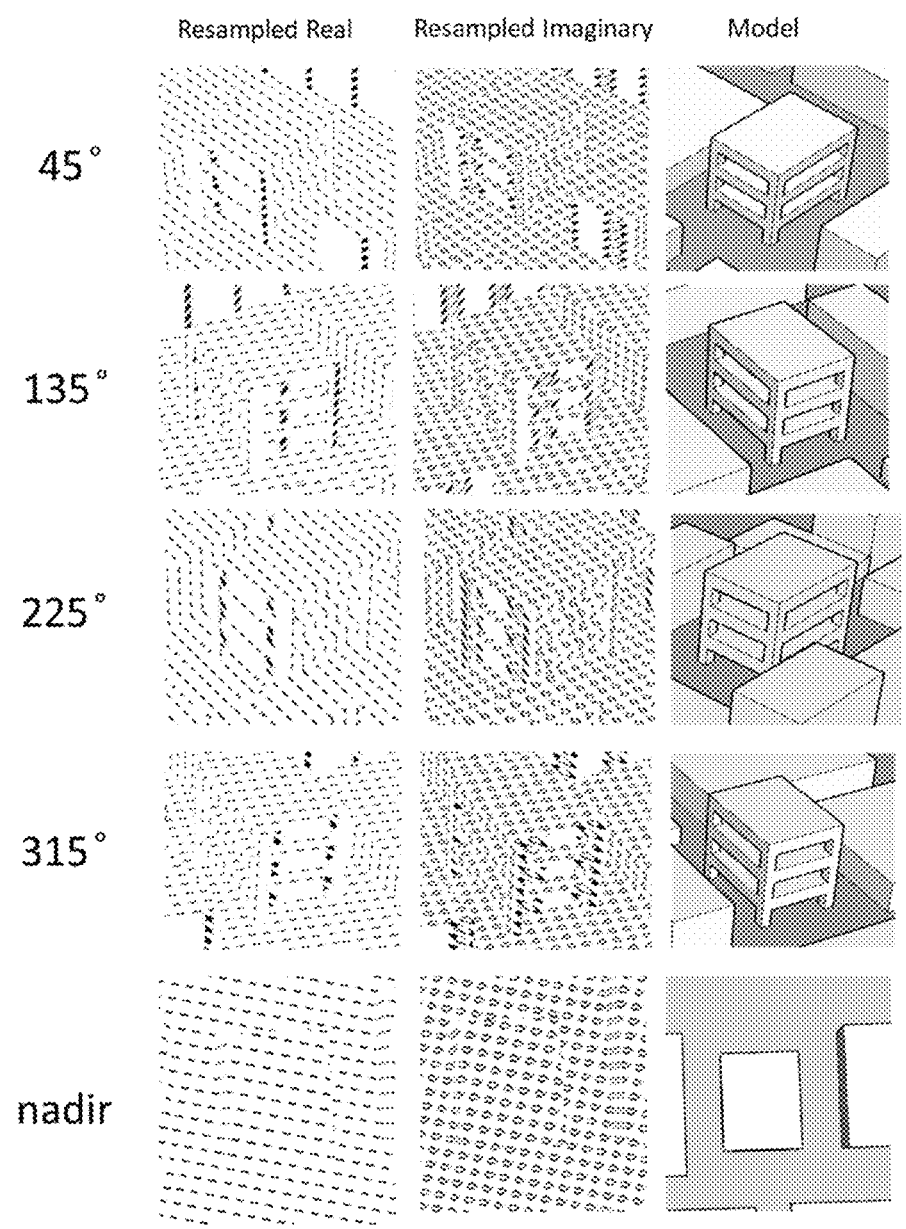
FIG. 16 illustrates resampling of both the real and imaginary complex data to form perspective gridded pixels, according to some embodiments.

This power profile calculation is performed on the surrounding tie-points as well and a correlation analysis is done to determine a common recommended "artifact free" time window for the center tie-point. FIG. 15 shows a sample power profile with an artifact free time window identified. Once the artifact free time window is determined, the remaining power profile pixels are analyzed to produce a correction vector that is applied to the frequency domain pixels in order to shape the power profile like that of the expected scene power profile. Once the complex pixels associated with the tie-point are prepared for projection to their final perceived location, the focal pixels from the original grid are mapped onto the tie-point grid through bilinear interpolation. These interpolated tie-point locations are then converted into specific pixel locations in the mitigated complex image and the complex pixels (e.g., the original SAR signal in the SLC or stripmap collections associated with specific pixels from the formed image identified as artifacts) are resampled with either bilinear, bi-cubic spline, a ripple-free polyphase filter, or other interpolation technique depending upon the throughput requirements of the application (e.g., bilinear interpolation may provide the fastest solution, though potentially with accuracy loss, and polyphase filter may provide the slowest solution, with potentially higher accuracy). FIG. 16 illustrates how both the real and imaginary complex data is resampled to form perspective gridded pixels.

Once all focal images are assembled from resampling, each model face is analyzed to determine the best vantage point for non-obstructed viewing using the focal vector projections from earlier rendering calculations. Once an optimal viewing angle is selected for each face, a new 3D face and vertex file is created that can be rendered by a standard software tool, (e.g., Google Earth, Trimble SketchUp, Autodesk AutoCAD, or Rhinoceros 3D). This new photo-realistic 3D model generated from SAR collection can be derived through methods such as stereo radargrammetry or interferometric SAR (InSAR). In some embodiments, to generate a 3D model from SAR imagery, at least two SAR collections/images may be used, though more images can in some embodiments result in a higher quality 3D model. In stereo radargrammetry, like photogrammetry, 3D coordinates of an object or scene may be derived by triangulating nodes of features exhibited in the set of images where the images are taken from different camera (or sensor) locations. This method would focus more on the amplitude of the SAR collection. InSAR is able to generate 3D surface models of a scene using two or more SAR collections by exploiting changes in the phase history of the radar signal. In some circumstances, InSAR can be a more robust method than stereo radargrammetry, however, in some such cases, the InSAR method may have strict input requirements to run successfully. In cases in which InSAR may not be feasible or is less desirable, stereo radargrammetry may be employed to generate a new 3D model of the scene.

Artificially Intelligent Training Data

In some embodiments, the resulting artificial SAR image retains labeled metadata describing the modeled 3D features as well as satellite properties. These images may be used to build a set of training data for machine learning techniques, which may in turn be used for enhanced feature classification.

In the process of generating simulated imagery from the different orientations as defined by the ambiguity zones for artifact suppression, the associated area of interest (AOI) or image collection geometry may have SAR target signatures that can further be interpolated, with the assistance of 3D mapping, to provide a full view of the area. This library can contain both simulated SAR imagery and collected SAR imagery.

In some embodiments, an output of generating simulated SAR signatures for artifact suppression may be the association of 3D face and vertex files with 2D features. A library of annotated images can be associated with each 3D volumetric model input to a SAR simulator. The SAR simulator may be a ray-tracing based program, including a package such as GRECO-SAR or RaySAR. Virtual twins of an AOI can be constructed by an analyst who is familiar with the features of the scene. In the process of assembling the scene, the analyst can label features from the associated SAR image to build out a library of 2D features that correspond with the particular 3D model. For feature detection within the library, the image can be searched through methods such as a 2D match filter or feature encoding technique. Simulation chips can be encoded through dictionary encoding, with input SAR collections also encoded through dictionary encoding. From this process, a database of SAR images related to specific features can be produced, which can then be related to 3D models. Machine learning apparatus like Bayesian/Gaussian and other probabilistic classifiers, support vector machines (SVM), variance considered machine (VCM), and convolutional neural networks (CNN) with varying deep learning architecture can be trained to identify features within this library. The machine learning apparatus would receive a SAR image chip with an unidentified feature as an input and would output a classification of that feature. Real SAR collections can be annotated by an analyst when input into the library. Classifications are returned, and the machine learning apparatus may be able to generate such classifications with high confidence. In some embodiments, as additional scenes are simulated, or new real data is collected, new images can be input into the training library to strengthen the detection algorithm.

When a 2D feature is identified from SAR imagery, a 3D model match can be determined from the dictionary of 2D SAR images/3D models through a search algorithm. Additional 3D features of the identified model can be extracted that can inform the analyst on geometric details of the 3D features. This is particularly advantageous for architectural renderings generated in programs such as Trimble SketchUp, Autodesk AutoCAD, or Rhinoceros 3D. Geometric properties of structures such as building heights or tank diameter can be extracted from the final new 3D face and vertex file generated as an output of the photorealistic SAR process through radargrammetry or InSAR. Such properties can be applied to 3D models, including automatically generated or hand generated 3D models, to improve the output of the SAR simulated scene. This feedback loop between SAR collections and 3D model of the scene can provide an up-to-date and complete volumetric representation of the scene. In some embodiments, this additional geometric information may also allow for automatic 3D model updating over surface models, as described below.

SAR Simulator Supported 3D Change Detection

Change detection can be challenging on processed SAR imagery, as algorithms to convert the SAR signal to a ground projected formed image can introduce artifacts that warp the representation of the data. By working in the space of the SAR signal, in some embodiments 3D change analytics can be performed directly on SAR pixels without the challenges introduced by 2D pixel formation assumptions. In some cases, high resolution (e.g., <0.5 m ground in the range dimension) SAR collections may be needed to achieve a desired level of detail for change detection on 3D structures. Described herein is an approach to automatically and globally detect spatial/3D change at low resolution and move to high resolution when a change is detected. In some embodiments, through 3D mapping described previously, detected changes may then be projected back onto the 3D surface model to identify and highlight areas and vertices for update, as described below.

Satellite system modes vary widely across available ground resolution. Some systems have modes that allow collection across very large areas with very large effective pixel sizes, which can detect general change in a scene but are not suitable to characterize subtle change. Satellite systems with a smaller pixel size (and hence higher resolution) also have a smaller coverage footprint, rendering a considerably higher cost to provide imagery over the full coverage of the AOI. In some embodiments, a hybrid collection methodology can be used in which area change detection is performed quickly and repetitively and high resolution imagery is then acquired on areas where sufficient change is detected. In these embodiments, this may limit the time and expense of acquisition or processing of high resolution imagery.

In addition to localizing areas within the 3D model of the image collection geometry, a stack of SAR imagery can be compared to the previous image in the time history to track relative changes. Transient changes can be filtered out as they may not have lasting effect on the topography of the AOI. Time history tracking can also provide provenance to the change detection, assigning a time frame for when a change in the landscape was first detected. This may be helpful for 3D model updating in some embodiments, as described below. This feature may also allow tracking of a rate of change, giving the ability to prioritize regions with rapid development and predict areas that have a high probability of crossing the threshold set by a change metric.

Through the use of a land-use land-cover (LULC) mask, the SAR collection can be filtered such that the change detection algorithm only searches within certain regions of the scene. In some embodiments, the LULC mask is user specified, determined automatically by analyzing the SAR data, or obtained through other suitable means. For example, the initial LULC mask can be downloaded from a United States Geological Survey (USGS) database, determined through Landsat 8, Sentinel-2, or Moderate Resolution Imaging Spectroradiometer (MODIS) satellite image data or another source, and/or determined through analysis. This localizes monitoring only to relevant areas, such as urban landscapes where construction/destruction of infrastructure is probable, further reducing falsely detected change and increasing detection precision. The contents of the LULC mask can also be monitored, to enable tracking changes within an area of interest over time, e.g., land classification perimeters. The area of interest may be specified as a geospatial shape file or using another suitable geospatial vector data format that can spatially describe vector features, e.g., land or water features. Monitoring the contents of the LULC mask may include tracking the actual shape of the mask and how that is changing, e.g., to see if areas identified as "urban" are taking up more area on the mask. This could support forecasting urban growth or deforestation models.

3D Model Updating

In some embodiments, in the 3D models derived through SAR collections (which can be generated through both simulated SAR imagery and real SAR collections), it may be the case that features, or detailed features of objects, no longer agree with the 3D modeled image geometry of the collection scene. SAR collections provide a dynamic view of the scene, describing a time sensitive representation of the scene. The corresponding virtual representation of the scene is static, and thus at any time may be in need of update to capture up-to-the-moment details of the AOI.

Vertex level change detection between sets of 3D models may determine the magnitude of volumetric change in terms of a distance metric. Although surface models generated through InSAR or radargrammetry are considered directly in at least some of the described embodiments, any combination of 3D models pairs within available 3D explicit data (e.g., 3D architectural models, point clouds, digital surface models, etc.) are possible. These models may use a shared ground resolution, which can be accomplished through an interpolation method after registration such as 3D least squares surface matching. The local transformation is used to perform a coarse correlation and the global transformation is used to achieve point (e.g., pixel) level registration. A geometric comparison algorithm may be used to calculate the point-by-point difference between the pair of 3D models. This may be performed by measuring Euclidean distances between the model pair but can be accomplished through a different distance metric. Geometric information may be delivered with spectral information. Geometric spectral analysis offers an opportunity to refine results from direct 3D geometric measurements by taking into account feature-based cues of change to robustly determine the presence of change. The image texture delivered in the spectral data can also assist in feature extraction to assist the feature-driven cues described above.

The output of this 3D change detection returns both the locations and magnitude of change on a vertex level. This allows automatic edits to the vertices of 3D models with a concrete distance metric. The time history and LULC trending methods described previously may filter detections to reduce false positives such that volumetric distortions are not applied to the 3D models.

Example Computer/Software Implementations

Techniques operating according to the principles described herein may be implemented in any suitable manner. Included in the discussion above are a series of flow charts showing the steps and acts of various processes that suppress SAR artifacts from complex SAR data associated with a scene and generate a photo-realistic 3D model of the scene. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine. This includes operating on a commercial or privately held cloud computing system.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary processes that could be implemented in one or more functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1706 of FIG. 17 described below (i.e., as a portion of a computing device 1700) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 17:
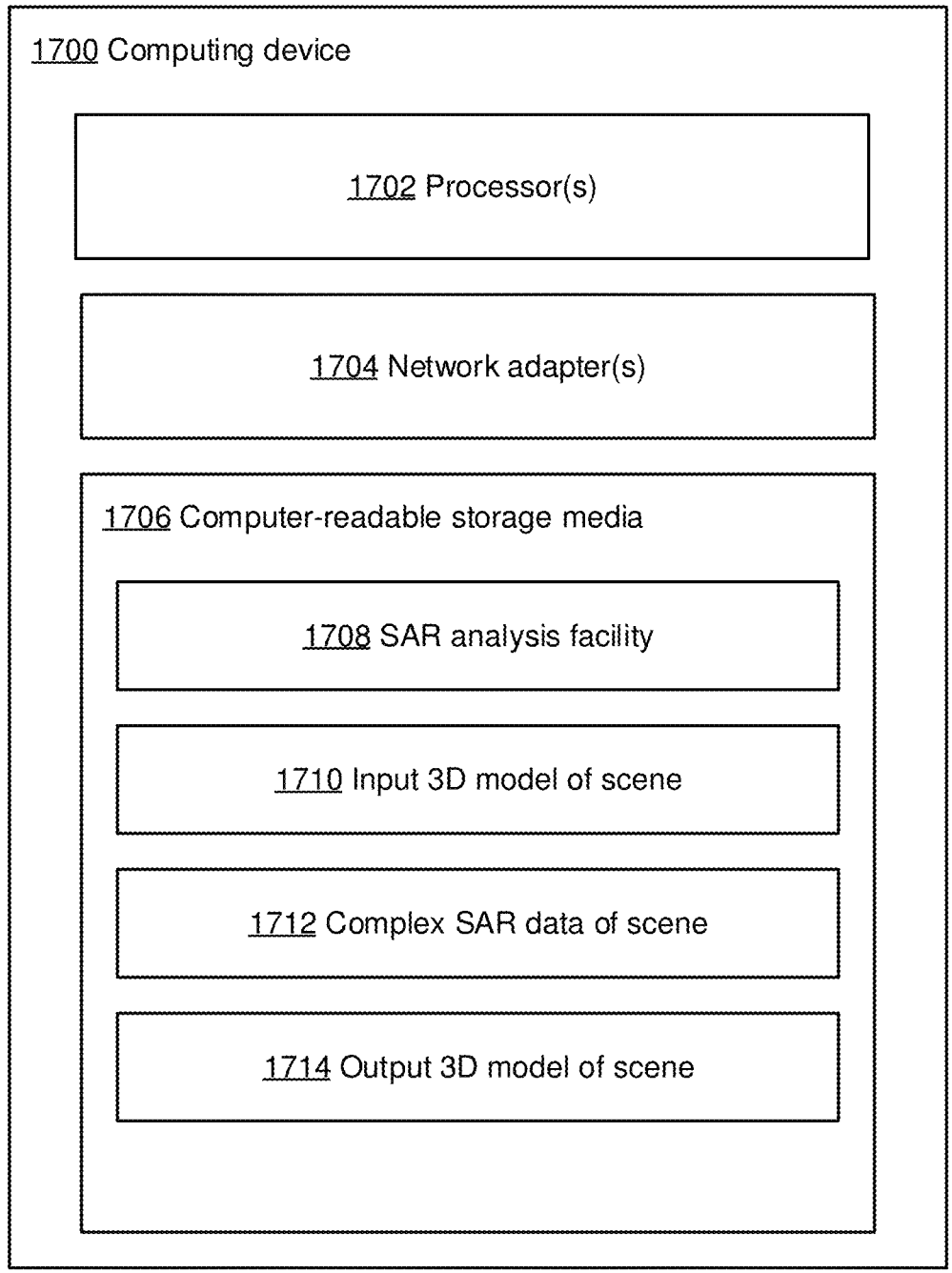
FIG. 17 illustrates an exemplary implementation of a computing device in the form of a computing device that may be used in a system implementing techniques described herein, according to some embodiments.

FIG. 17 illustrates one exemplary implementation of a computing device in the form of a computing device 1700 that may be used in a system implementing techniques described herein, although others are possible. It should be appreciated that FIG. 17 is intended neither to be a depiction of necessary components for a computing device to operate in accordance with the principles described herein, nor a comprehensive depiction.

Computing device 1700 may comprise at least one processor 1702 (which can be in the form of a CPU, GPU, or TPU), a network adapter 1704, and computer-readable storage media 1706. Computing device 1700 may be, for example, a desktop or laptop personal computer, a personal digital assistant (PDA), a smart mobile phone, a server, a cloud computing platform, or any other suitable computing device. Network adapter 1704 may be any suitable hardware and/or software to enable the computing device 1700 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1706 may be adapted to store data to be processed and/or instructions to be executed by processor 1702. Processor 1702 enables processing of data and execution of instructions. The data and instructions may be stored on the computer-readable storage media 1706.

The data and instructions stored on computer-readable storage media 1706 may comprise computer-executable instructions implementing techniques which operate according to the principles described herein. In the example of FIG. 17, computer-readable storage media 1706 stores computer-executable instructions implementing various facilities and storing various information as described above. Computer-readable storage media 1706 may store a SAR analysis facility 1708 that may implement one or more techniques described above. Media 1706 may additionally store an input 3D model of a scene 1710, complex SAR data of a scene 1712, and may store an output 3D model of a scene 1714 that may have been generated by facility 1708. In addition, media 1706 may store the annotated training library of both simulated SAR images and real SAR collections, change detection analytics output raster layers, and the encoded 2D feature library.

While not illustrated in FIG. 1700, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for creating a photo-realistic 3D model of a scene based on complex Synthetic Aperture Radar (SAR) data associated with the scene, the method comprising:
   mapping the complex SAR data associated with the scene to a 3D model of the scene;
   suppressing one or more SAR artifacts from the complex SAR data based on the mapping to obtain cleaned complex SAR data;
   resampling the cleaned complex SAR data to generate one or more two-dimensional (2D) SAR images of the scene; and
   generating the photo-realistic 3D model of the scene based on the one or more 2D SAR images of the scene.

2. The method of claim 1, wherein resampling the cleaned complex SAR data comprises resampling In-phase (I) and Quadrature-phase (Q) data of the complex SAR data to generate the one or more 2D images.

3. The method of claim 1, wherein generating the photo-realistic 3D model of the scene comprises creating a photo-realistic 3D model of the scene at least in part by using perspective modeling with the one or more 2D SAR images to simulate the scene from one or more viewing angles.

4. The method of claim 1, wherein generating the photo-realistic 3D model of the scene comprises generating the photo-realistic 3D model using InSAR and/or stereo radargrammetry.

5. The method of claim 1, wherein generating the photo-realistic 3D model of the scene comprises updating a photogrammetric 3D model of the scene.

6. The method of claim 1, further comprising:
   generating a library of training data associated with the scene, wherein generating the library comprises:
      obtaining simulated SAR data labeled with objects and features within the scene;
      associating 2D imagery data with a high-fidelity 3D surface model of the scene and 3D objects within the scene through one or more machine learning search algorithms; and
   extracting 3D features and objects from the simulated SAR data based on the photo-realistic 3D model of the scene.

7. An apparatus comprising:
   at least one processor; and
   at least one storage medium having encoded thereon executable instructions that, when executed by the at least one processor, cause the at least one processor to carry out a method for creating a photo-realistic 3D model of a scene based on complex Synthetic Aperture Radar (SAR) data associated with the scene, the method comprising:
      mapping the complex SAR data associated with the scene to a 3D model of the scene;
      suppressing one or more SAR artifacts from the complex SAR data based on the mapping to obtain cleaned complex SAR data;
      resampling the cleaned complex SAR data to generate one or more two-dimensional (2D) SAR images of the scene; and
      generating the photo-realistic 3D model of the scene based on the one or more 2D SAR images of the scene.

8. The apparatus of claim 7, wherein resampling the cleaned complex SAR data comprises resampling In-phase (I) and Quadrature-phase (Q) data of the complex SAR data to generate the one or more 2D images.

9. The apparatus of claim 7, wherein generating the photo-realistic 3D model of the scene comprises creating a photo-realistic 3D model of the scene at least in part by using perspective modeling with the one or more 2D SAR images to simulate the scene from one or more viewing angles.

10. The apparatus of claim 7, wherein generating the photo-realistic 3D model of the scene comprises generating the photo-realistic 3D model using InSAR and/or stereo radargrammetry.

11. The apparatus of claim 7, wherein generating the photo-realistic 3D model of the scene comprises updating a photogrammetric 3D model of the scene.

12. The apparatus of claim 7, wherein the method further comprises:
   generating a library of training data associated with the scene, wherein generating the library comprises:
      obtaining simulated SAR data labeled with objects and features within the scene;
      associating 2D imagery data with a high-fidelity 3D surface model of the scene and 3D objects within the scene through one or more machine learning search algorithms; and
   extracting 3D features and objects from the simulated SAR data based on the photo-realistic 3D model of the scene.

13. At least one non-transitory computer-readable storage medium having encoded thereon executable instructions that, when executed by at least one processor, cause the at least one processor to carry out a method for creating a photo-realistic 3D model of a scene based on complex Synthetic Aperture Radar (SAR) data associated with the scene, the method comprising:
   mapping the complex SAR data associated with the scene to a 3D model of the scene;
   suppressing one or more SAR artifacts from the complex SAR data based on the mapping to obtain cleaned complex SAR data;
   resampling the cleaned complex SAR data to generate one or more two-dimensional (2D) SAR images of the scene; and
   generating the photo-realistic 3D model of the scene based on the one or more 2D SAR images of the scene.

14. The non-transitory computer-readable storage medium of claim 13, wherein resampling the cleaned complex SAR data comprises resampling In-phase (I) and Quadrature-phase (Q) data of the complex SAR data to generate the one or more 2D images.

15. The non-transitory computer-readable storage medium of claim 13, wherein generating the photo-realistic 3D model of the scene comprises creating a photo-realistic 3D model of the scene at least in part by using perspective modeling with the one or more 2D SAR images to simulate the scene from one or more viewing angles.

16. The non-transitory computer-readable storage medium of claim 13, wherein generating the photo-realistic 3D model of the scene comprises generating the photo-realistic 3D model using InSAR and/or stereo radargrammetry.

17. The non-transitory computer-readable storage medium of claim 13, wherein generating the photo-realistic 3D model of the scene comprises updating a photogrammetric 3D model of the scene.

18. The non-transitory computer-readable storage medium of claim 13, wherein the method further comprises:
generating a library of training data associated with the scene, wherein generating the library comprises:
obtaining simulated SAR data labeled with objects and features within the scene;
associating 2D imagery data with a high-fidelity 3D surface model of the scene and 3D objects within the scene through one or more machine learning search algorithms; and
extracting 3D features and objects from the simulated SAR data based on the photo-realistic 3D model of the scene.

* * * * *